(12) United States Patent
Xiong et al.

(10) Patent No.: US 10,315,581 B2
(45) Date of Patent: Jun. 11, 2019

(54) FLEXIBLE CARGO COVER

(71) Applicant: Touching Design LLC, Sunnyvale, CA (US)

(72) Inventors: Dan Xiong, Sunnyvale, CA (US); Jinyao Feng, Sunnyvale, CA (US)

(73) Assignee: Touching Design LLC, Sunnyvale, CA (US)

( * ) Notice: Subject to any disclaimer, the term of this patent is extended or adjusted under 35 U.S.C. 154(b) by 0 days.

(21) Appl. No.: 15/946,639

(22) Filed: Apr. 5, 2018

(65) Prior Publication Data

US 2018/0222392 A1 Aug. 9, 2018

Related U.S. Application Data

(63) Continuation-in-part of application No. 29/565,870, filed on May 25, 2016.

(51) Int. Cl.
*B60R 5/04* (2006.01)
*B60P 7/04* (2006.01)
*B60R 7/02* (2006.01)

(52) U.S. Cl.
CPC ............... *B60R 5/045* (2013.01); *B60P 7/04* (2013.01); *B60R 5/04* (2013.01); *B60R 7/02* (2013.01)

(58) Field of Classification Search
CPC ........... B60R 5/04; B60R 11/06; B60R 5/045; B60R 7/02; B60P 7/04
USPC ................................................... 296/136.01
See application file for complete search history.

(56) References Cited

U.S. PATENT DOCUMENTS

| | | | | |
|---|---|---|---|---|
| 3,515,426 A * | 6/1970 | Gerber | ...................... | B60P 3/38 135/117 |
| 4,607,876 A * | 8/1986 | Reed | ......................... | B60P 7/02 135/88.13 |
| 4,877,283 A * | 10/1989 | Little | ....................... | B60J 7/104 296/100.18 |
| D319,610 S * | 9/1991 | Janke | .......................... | D12/401 |
| 5,687,895 A * | 11/1997 | Allison | ..................... | B60R 7/02 220/23.4 |
| 6,821,600 B1 * | 11/2004 | Henson | ..................... | B32B 3/06 190/1 |
| 7,438,338 B1 * | 10/2008 | Schumacher | ............. | B60R 5/04 222/404 |
| 7,819,451 B2 * | 10/2010 | Yoshida | .................... | B60R 7/02 296/24.4 |
| 9,039,062 B1 * | 5/2015 | Gregory | ................. | B62D 33/03 296/37.6 |
| 9,421,932 B2 * | 8/2016 | Renforth | ............... | B60R 21/026 |
| 9,511,654 B2 * | 12/2016 | Breen | ................... | B60P 7/0876 |

(Continued)

OTHER PUBLICATIONS

Bestop, "Duster Deck Covers"—Downloaded on Feb. 12, 2019 from https://www.bestop.com/duster/ ; Prior art publication at least as of Jun. 8, 2016.

*Primary Examiner* — Pinel E Romain

(57) ABSTRACT

An example flexible cargo cover may be made of a foldable material; the example cargo cover may comprise: a first edge that is substantially straight; a second edge on an opposite side of the first edge; a third edge having a first concave; a fourth edge on an opposite side of the first edge and having a second concave; and a plurality of connectors. A first set of connectors in the plurality of connectors are installed on the third edge and a second set of connectors in the plurality of connectors are installed on the fourth edge.

20 Claims, 25 Drawing Sheets

(56) References Cited

U.S. PATENT DOCUMENTS

| 2013/0121785 A1* | 5/2013 | Coury | B60P 7/06 |
| | | | 410/97 |
| 2016/0167562 A1* | 6/2016 | Dennis | B60P 7/0892 |
| | | | 410/97 |

* cited by examiner

FLEXIBLE CARGO COVER

CROSS REFERENCE TO RELATED APPLICATIONS

This application is a continuation-in-part of patent application Ser. No. 29/565,870, filed May 25, 2016, and entitled "flexible cargo cover," which is hereby incorporated by reference in its entirety.

TECHNICAL FIELD

The present disclosure relates generally to cargo covers, and more specifically, to vehicle cargo covers.

BACKGROUND

A lot of different accessories have been applied to secure and organize cargos stored in a vehicle. For example, for vehicles with open or soft roofs, it may be desirable to have a cargo cover in order to keep the valuables stored in the cargo area hidden from outside view. For another example, for vehicles with large cargo areas, it may be desirable to have organizers, such as belts, dividers, and nets to keep items stored in the cargo area organized.

Conventionally, multiple accessories are needed to achieve these goals. And accessories may not work well together and may require complicated installations and modifications.

These technical problems are reduced or eliminate by the flexible cargo cover described in the present disclosure.

SUMMARY OF INVENTION

Various embodiments of a flexible cargo cover are provided in the present disclosure.

A flexible cargo cover may be made of a foldable material and comprise: a first edge that is substantially straight; a second edge on an opposite side of the first edge; a third edge having a first concave; a fourth edge on an opposite side of the first edge and having a second concave; and a plurality of connectors, wherein a first set of connectors in the plurality of connectors are installed on the third edge and a second set of connectors in the plurality of connectors are installed on the fourth edge.

The first set of connectors and the second set of connectors each includes three connectors.

Each connector may include a metal slot that is configured to be bolted to an edge of a vehicle. The edge of the vehicle may be a tub-edge.

Each connector in the first set of connectors and the second set of connectors may include a strip.

The strip may be length-adjustable and elastic. The connectors in the first set of connectors and the second set of connectors are metal clips.

The connectors in the first set of connectors and the second set of connectors may include tie-down D-rings.

The flexible cargo cover may be configured to be folded at two or more different locations.

The flexible cargo cover may be made of polyester.

The first concave and the second concave are of a shape similar to a support pillar of a JEEP vehicle.

The flexible cargo cover may include a plurality of pockets.

The flexible cargo cover may be configured to be installed at least three locations of a cargo area inside a vehicle.

The flexible cargo cover may be of a non-translucent color.

The flexible cargo cover may be made of sunlight blocking material.

The flexible cargo cover may be made of tear-resistant material.

The flexible cargo cover may be made of water-repelling material.

The flexible cargo cover may be made of light-weight material.

The flexible cargo cover may further comprise a plurality of tie-down straps configured to tie one or more mobile items to the flexible cargo cover.

The plurality of tie-down straps each may include a strap slot for strapping a mobile item to the flexible cargo cover.

BRIEF DESCRIPTION OF THE DRAWINGS

FIG. 23 illustrates how an example cargo cover may be affixed to a

Embodiments of the present disclosure and their advantages are best understood by referring to the detailed description that follows. It should be appreciated that like reference numerals are used to identify like elements illustrated in one or more of the figures.

DETAILED DESCRIPTION

The flexible cargo cover disclosed in the present disclosure is capable of providing full protection of privacy by installing a removable cargo cover under a soft top or a hard top. Also, quick and easy installation is granted due to no-drilling installation, fasten to factory mounting holes, and no tailgate bar needed.

The present disclosure provides example cargo cover for a Jeep Wrangler as well as systems and methods for installation. The apparatus described in the present disclosure can provide the following advantages. First, specially designed to be easy to install and remove. Second, an example cargo cover is configured to be tear resistant, lightweight, water-repelling, easy to clean, adjustable and durable. Third, the cargo cover stretches over the rear cargo area, helping keep contents of the cargo area concealed giving added measure of security. Forth, it protects and covers while still allowing access to the rear cargo area. In the event of any accident, it also cushions the impact, protecting your belongings, as well as concealing valuables and deterring thieves while protecting the important assets.

A flexible cargo cover provided in the present disclosure may be installed on a Jeep Wrangler Sport vehicle, a Jeep Rubicon vehicle, and a Sahara Unlimited 4DR/2DR vehicle.

A cargo cover provided in the present disclosure may provide a flexible solution for Jeep Wrangler cargo privacy protection and organization. An example cargo cover may be made of water-repellent durable pro-grade nylon with structural form fitting stiffeners. The cargo cover may be installed in minutes, for example, by mounting them in multiple configurations according to a user's need, regardless whether a vehicle's rear seat is up, down, folded, or removed. No drilling is required in some embodiments. An example cargo cover may also be uninstalled or tucked away in seconds to regain an open cargo area. An example cargo cover may be used in conjunction with a cargo organizer. A cargo cover provided in the present disclosure may be used as a back seat pocket, a cargo area divider, and a tailgate cover.

Additional details of implementations are now described in relation to the Figures.

Figure 1:
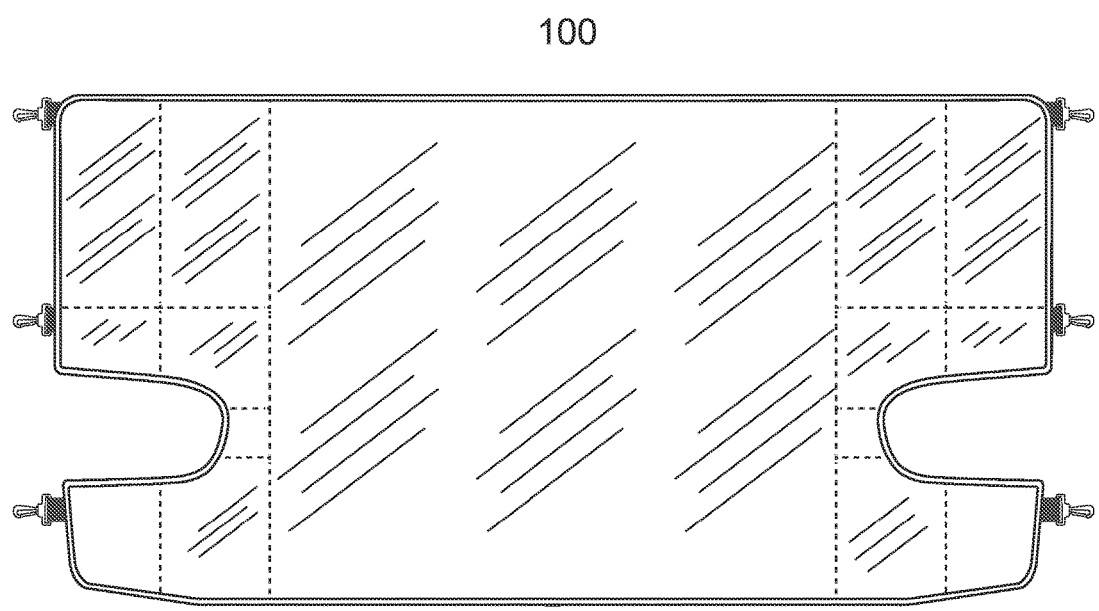
FIG. 1 illustrates a top view of a cargo cover in accordance with some embodiments.

FIG. 1 illustrates a top view of a cargo cover 100 in accordance with some embodiments.

As shown in FIG. 1, the cover 100 includes six buckles, three on each side. The cover 100 may be folded along the dashed lines for easier storage and increased mobility.

The cover 100 may be installed on a Jeep Wrangler vehicle for the purpose of protecting privacy and belongings. It is a feature of selected embodiments that the cargo cover made of water-repellent durable professional grade polyester or nylon with structural form-fitting stiffeners.

Different features mount them in multiple configurations according to different needs as the cargo cover reconfigurable to a top on or topless Jeep Wrangler cargo area. Added upper deck attachment points with the 6-matching tie-down D-rings allow attaching tools, belts, straps, bags, wires, etc.

Multiple configurations to cover cargo area with completely privacy regardless the rear seat is up, down, folded or removed. In some embodiments, a flexible cargo cover can be configured to cover a vehicle's cargo area fully or partially to allow larger size items to be carried in the cargo space.

Figure 2:
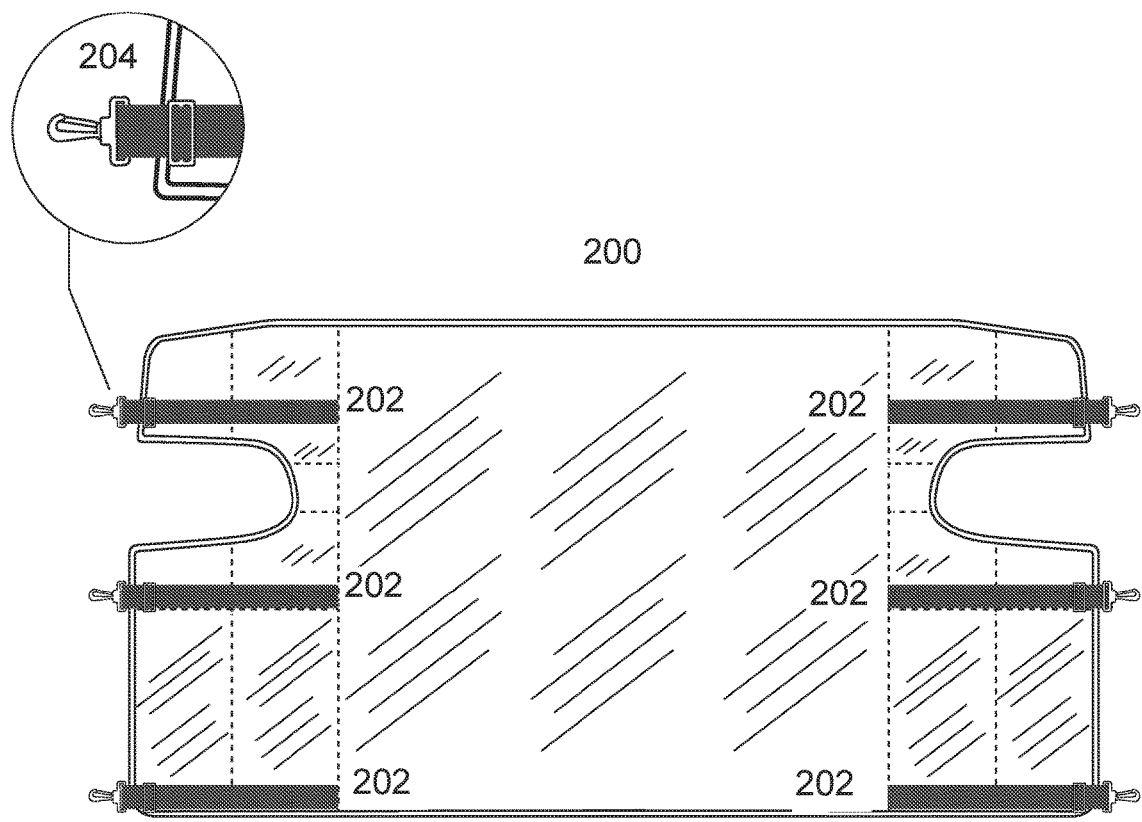
FIG. 2 illustrates a bottom view of a cargo cover in accordance with some embodiments.

FIG. 2 illustrates a bottom view of a cargo cover 200 in accordance with some embodiments.

As shown in FIG. 2, the cover 200 includes six straps 202. Each strap 202 includes a buckle 204 for securing the cover 200 to a fixture within a vehicle, such as a hook. The length of a strap 200 is adjustable to make the installation more easily and to provide increased flexibility. The cover 200 may also be folded along the dashed lines for easier storage and increased mobility. The straps 202 may be made of soft materials so that they can be folded as well.

Figure 3:
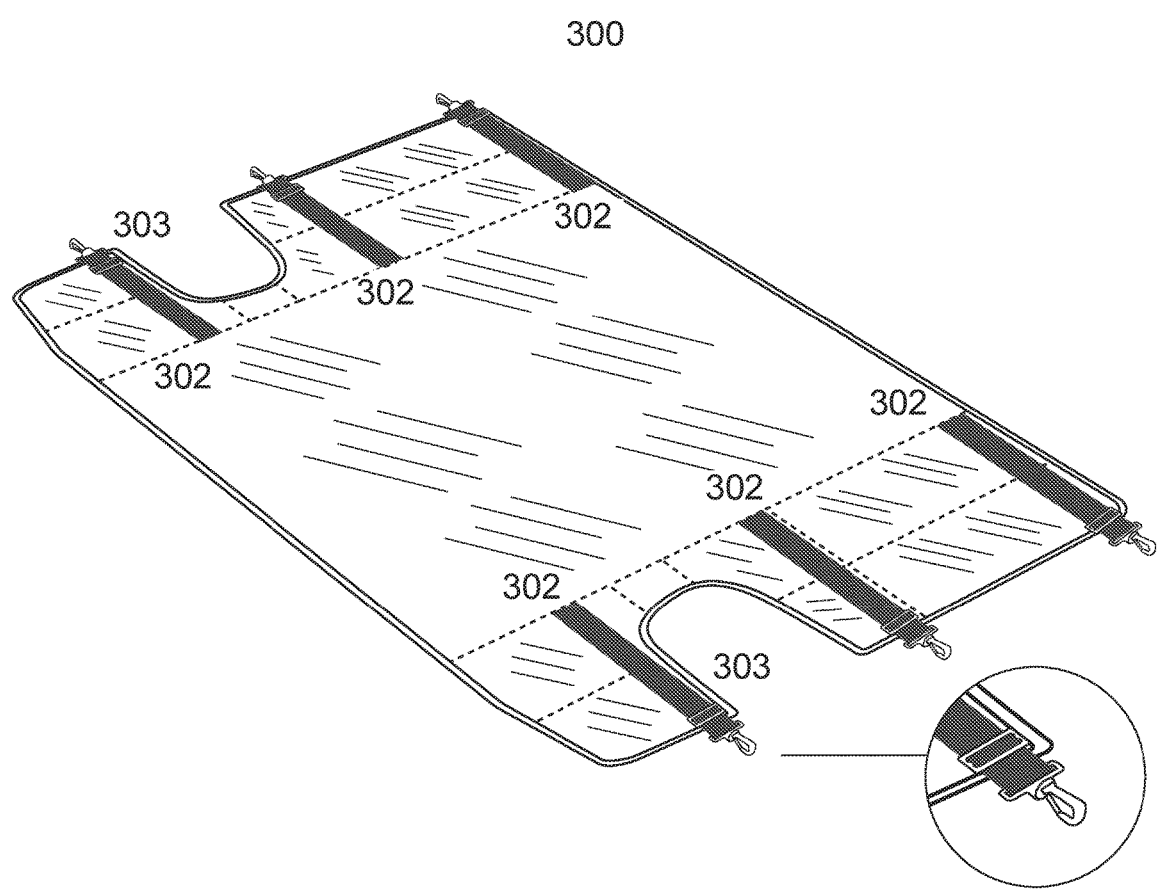
FIG. 3 illustrates a perspective view of a cargo cover in accordance with some embodiments.

FIG. 3 illustrates a perspective view of a cargo cover 300 in accordance with some embodiments. As shown in FIG. 3, two straps are fixed at the bottom edge of the cover 300, two straps are fixed at approximately the middle of the cover 300, and two straps are fixed at one edge of the opening 303. The straps are placed on the edge of the opening 303 to secure the upper portion of the cover 300.

Figure 4:
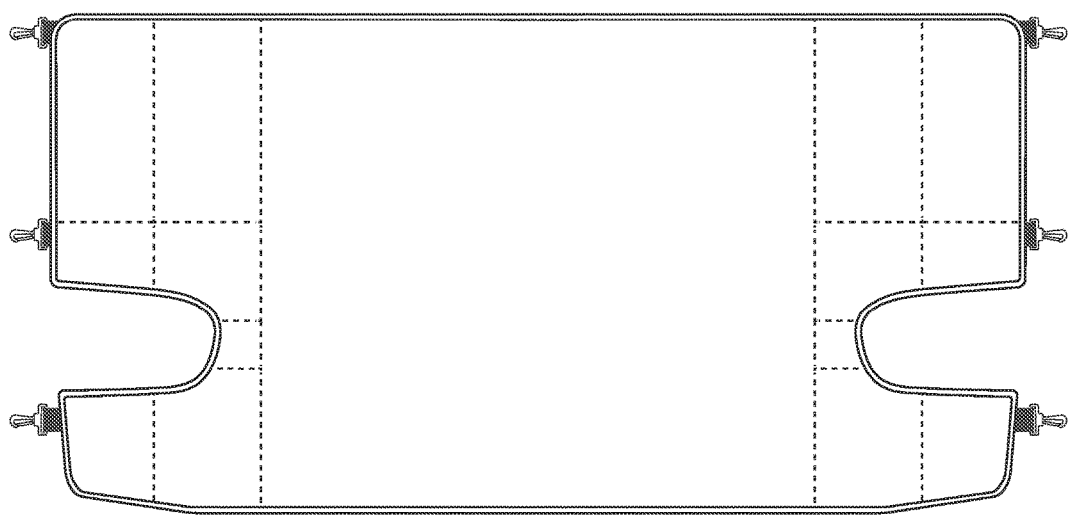
FIG. 4 illustrates a top view of a cargo cover in accordance with some embodiments.

FIG. 4 illustrates a top view of a cargo cover 400 in accordance with some embodiments.

As shown in FIG. 4, the dashed lines are the positions along which the cover 400 may be folded. As seen, a cargo cover disclosed in the present disclosure may be folded on the front side as well as on the back side, providing increased flexibility and mobility.

Figure 5:
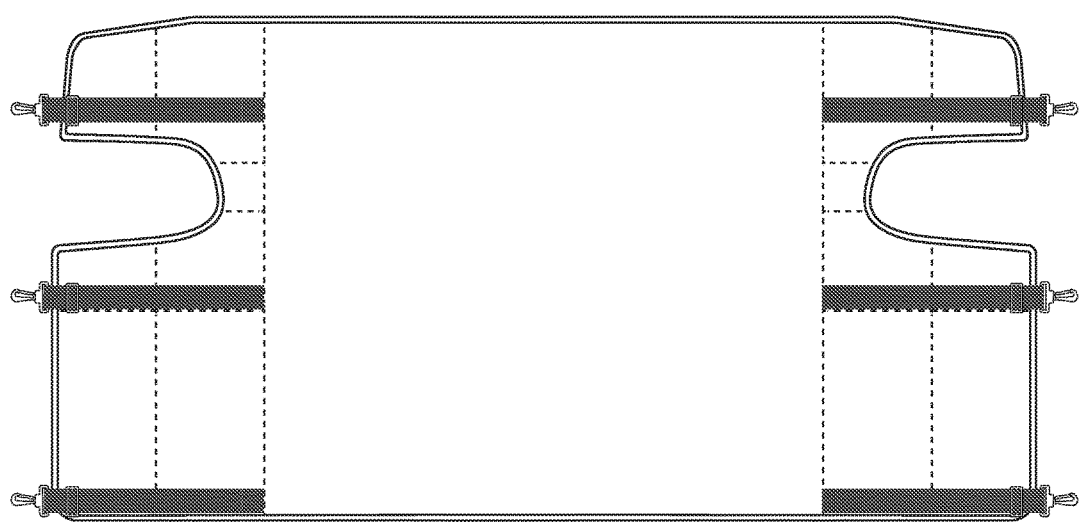
FIG. 5 illustrates a bottom view of a cargo cover in accordance with some embodiments.
Figure 6:
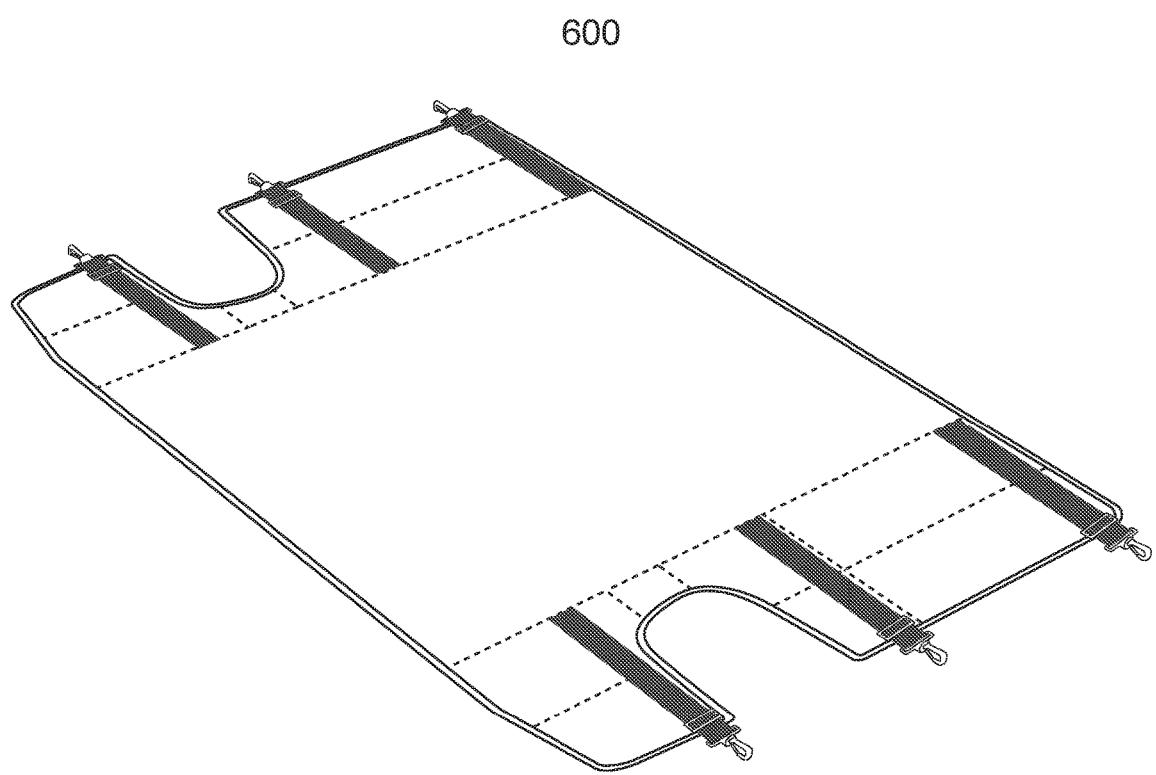
FIG. 6 illustrates a perspective view of a cargo cover in accordance with some embodiments.

FIG. 5 illustrates a bottom view of a cargo cover 500 in accordance with some embodiments. FIG. 6 illustrates a perspective view of a cargo cover 600 in accordance with some embodiments.

Figure 7:
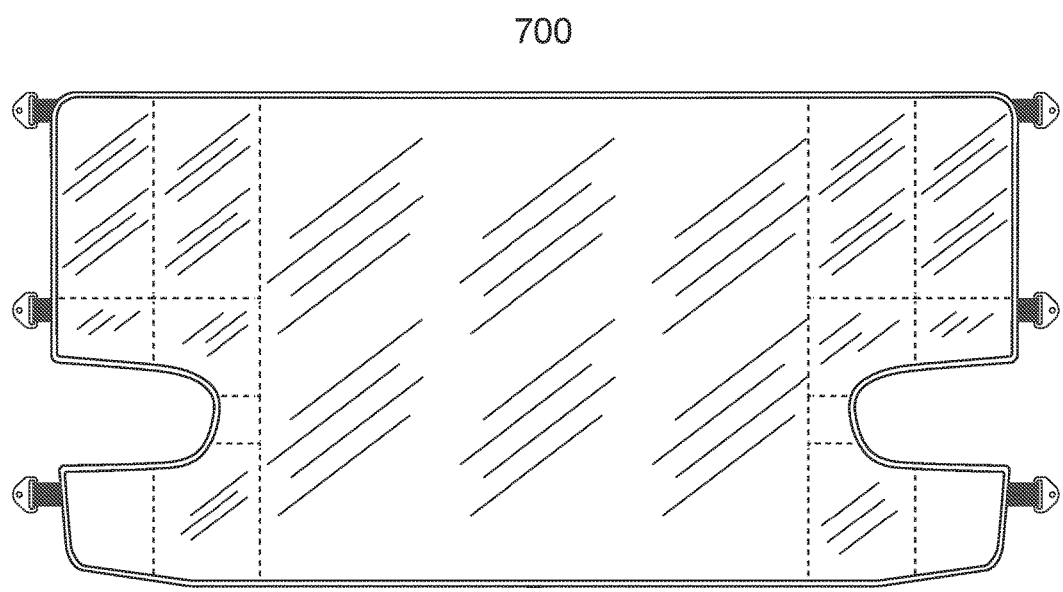
FIG. 7 illustrates a top view of a cargo cover in accordance with some embodiments.

FIG. 7 illustrates a top view of a cargo cover 700 in accordance with some embodiments. As shown in FIG. 7, the cover 700 includes six buckles, which are different from the buckles shown in FIGS. 2 and 3.

Figure 8:
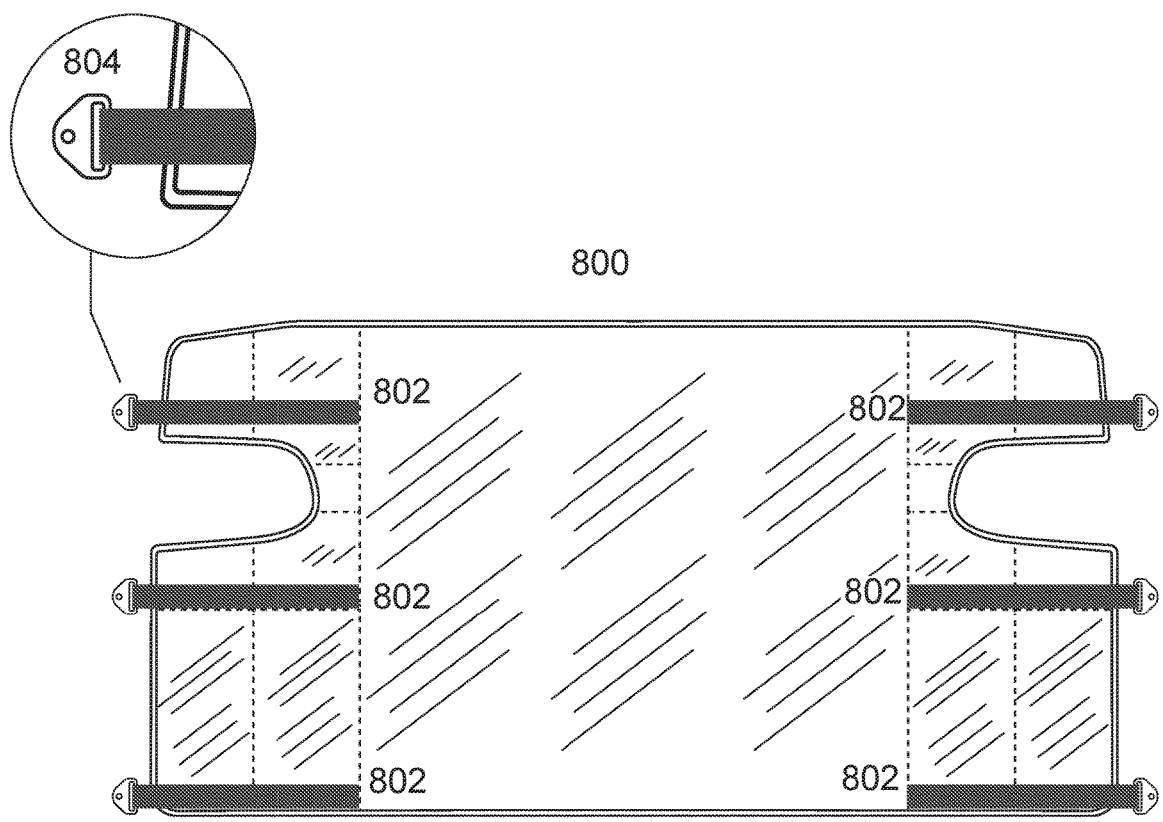
FIG. 8 illustrates a bottom view of a cargo cover in accordance with some embodiments.

FIG. 8 illustrates a bottom view of a cargo cover 800 in accordance with some embodiments. As shown in FIG. 8, the cover 800 includes six buckles 802. The buckles 802 are configured to be bolted to certain fixtures in a JEEP vehicle. As shown, the metal piece 804 has a triangle shape front and a rectangle shape end. The triangle shape front provides a wider angle of attachment and thus great flexibility; the rectangle shape end provides a wider contact surface for securing the cover 800 to fixtures within a vehicle.

Figure 9:
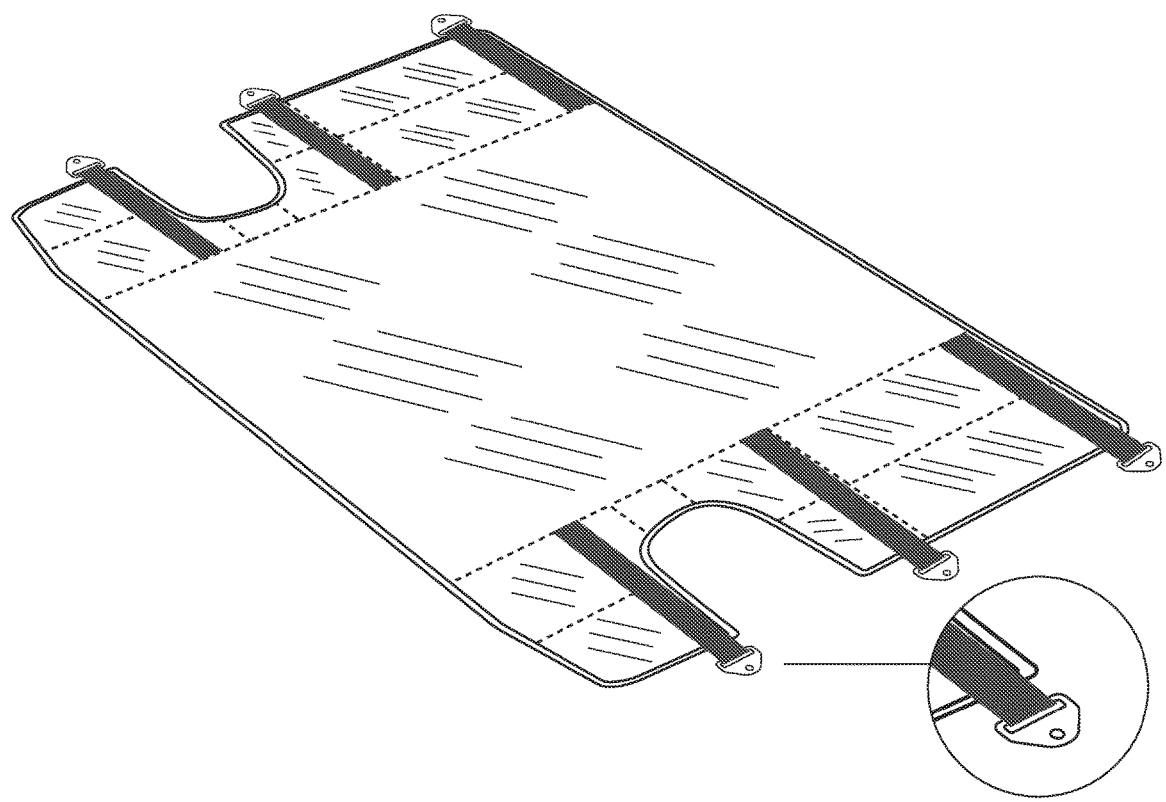
FIG. 9 illustrates a perspective view of a cargo cover in accordance with some embodiments.
Figure 10:
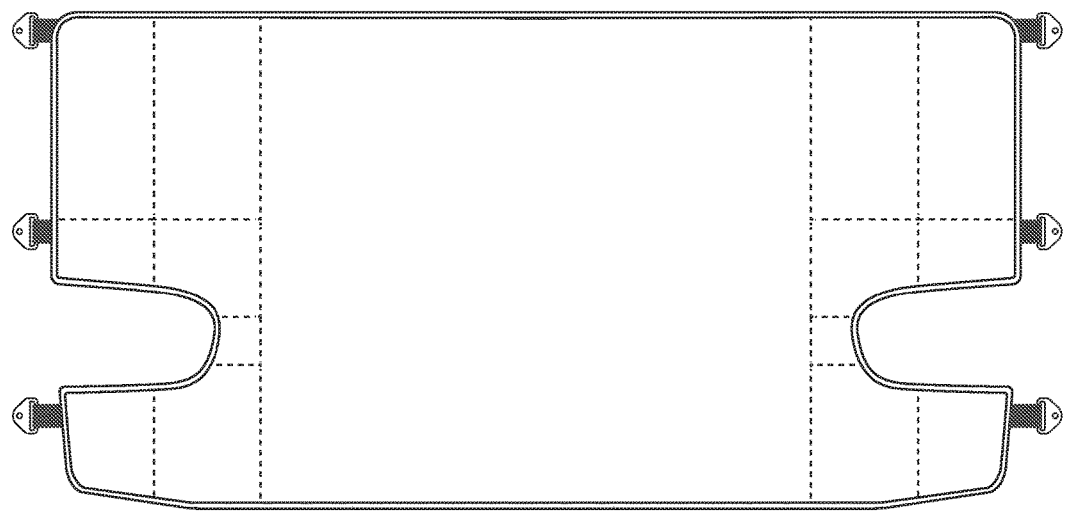
FIG. 10 illustrates a top view of a cargo cover in accordance with some embodiments.
Figure 11:
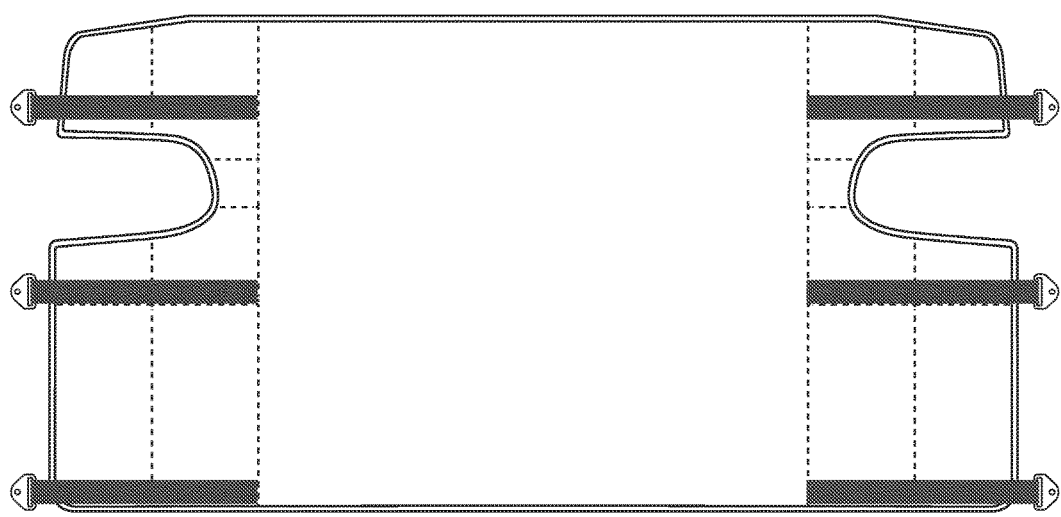
FIG. 11 illustrates a bottom view of a cargo cover in accordance with some embodiments.
Figure 12:
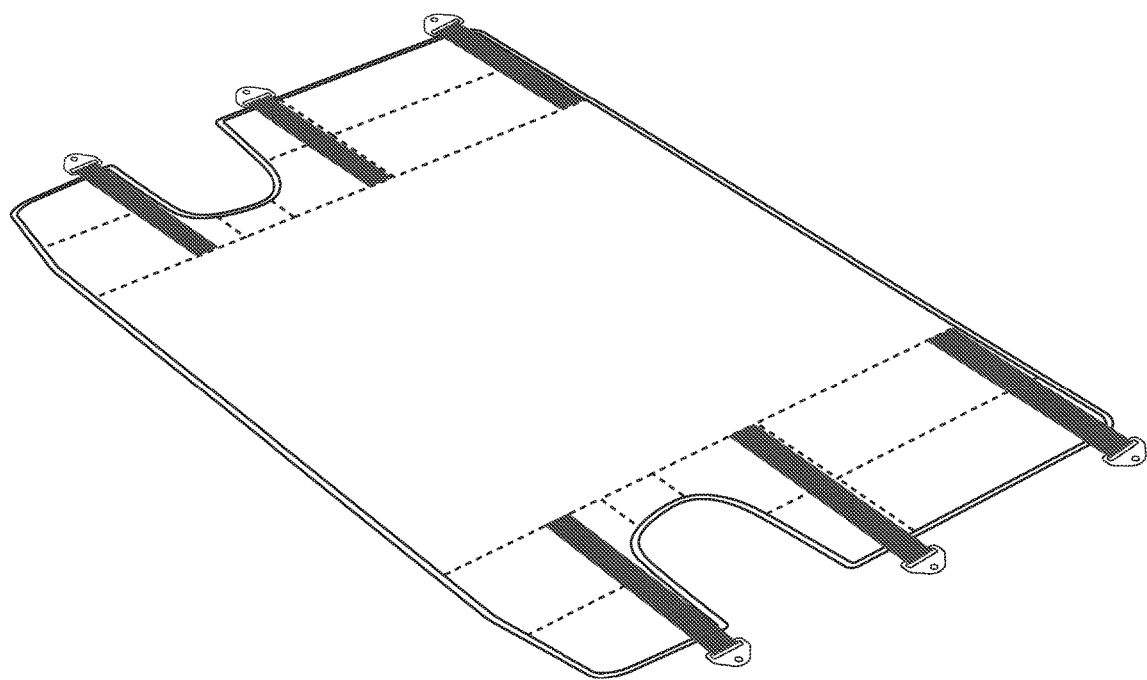
FIG. 12 illustrates a perspective view of a cargo cover in accordance with some embodiments.

FIG. 9 illustrates a perspective view of a cargo cover in accordance with some embodiments. FIG. 10 illustrates a top view of a cargo cover in accordance with some embodiments. FIG. 11 illustrates a bottom view of a cargo cover in accordance with some embodiments. FIG. 12 illustrates a perspective view of a cargo cover in accordance with some embodiments.

A shown in FIGS. 9-12, an example flexible cargo cover may be folded alone the dashed lines. Three rows of bucks are provided so that a cover may be affixed to six different positions of a cargo area.

Figure 13:
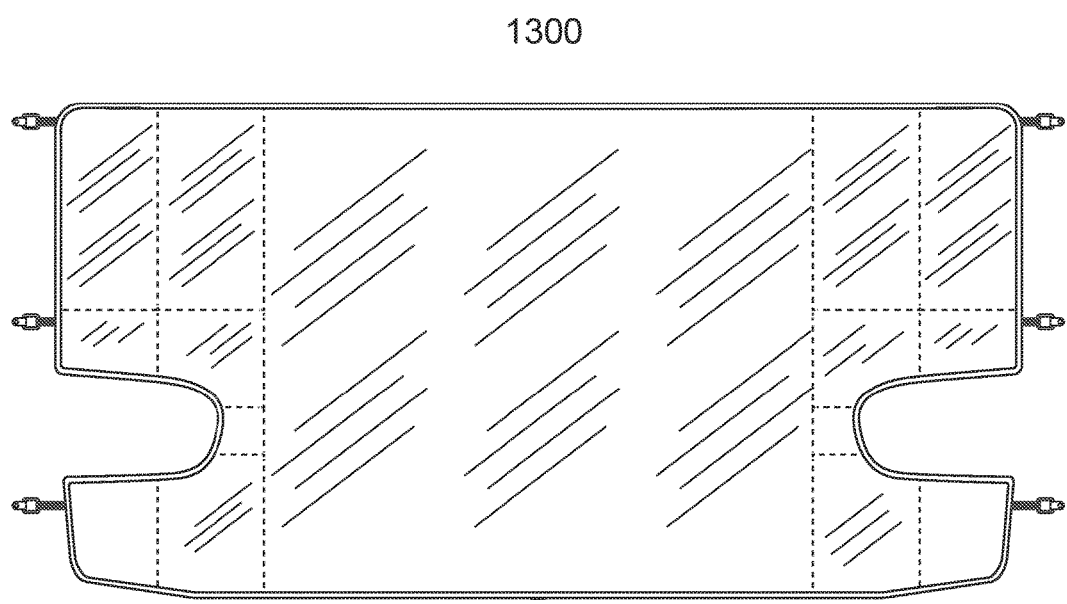
FIG. 13 illustrates a top view of a cargo cover in accordance with some embodiments.

FIG. 13 illustrates a top view of a cargo cover 1300 in accordance with some embodiments. As shown in FIG. 13, the cargo cover 1300 may include three pairs of buckles. The bucks can be affixed to tie-down D-rings directly, so as to eliminate intermediary connecting components.

Figure 14:
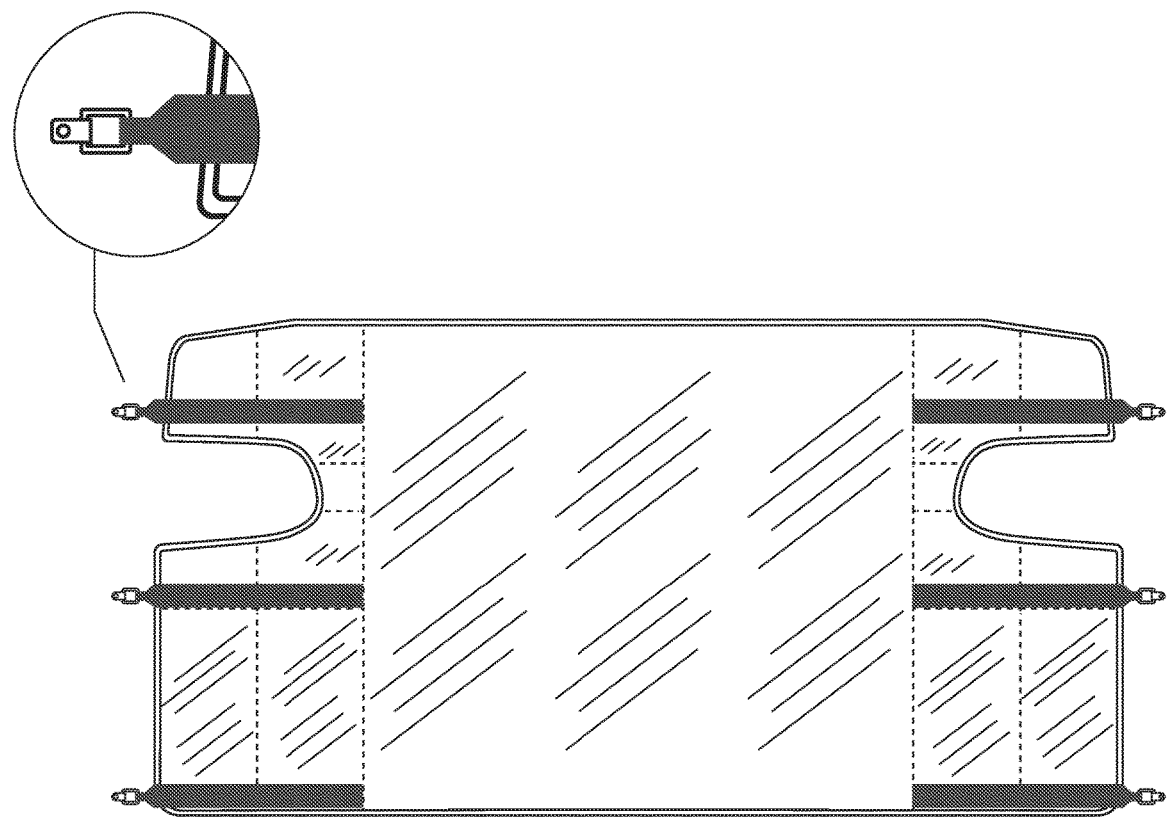
FIG. 14 illustrates a bottom view of a cargo cover in accordance with some embodiments.

FIG. 14 illustrates a bottom view of a cargo cover 1400 in accordance with some embodiments.

Figure 15:
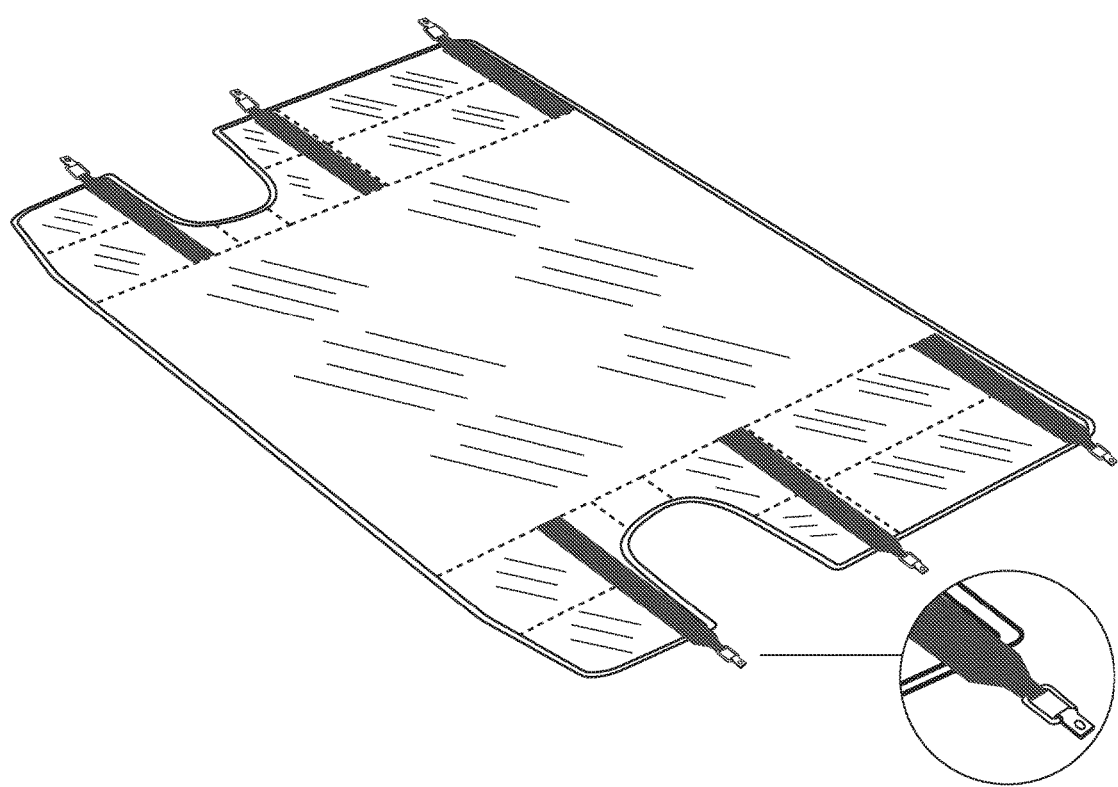
FIG. 15 illustrates a perspective view of a cargo cover in accordance with some embodiments.

FIG. 15 illustrates a perspective view of a cargo cover 1500 in accordance with some embodiments.

Figure 16:
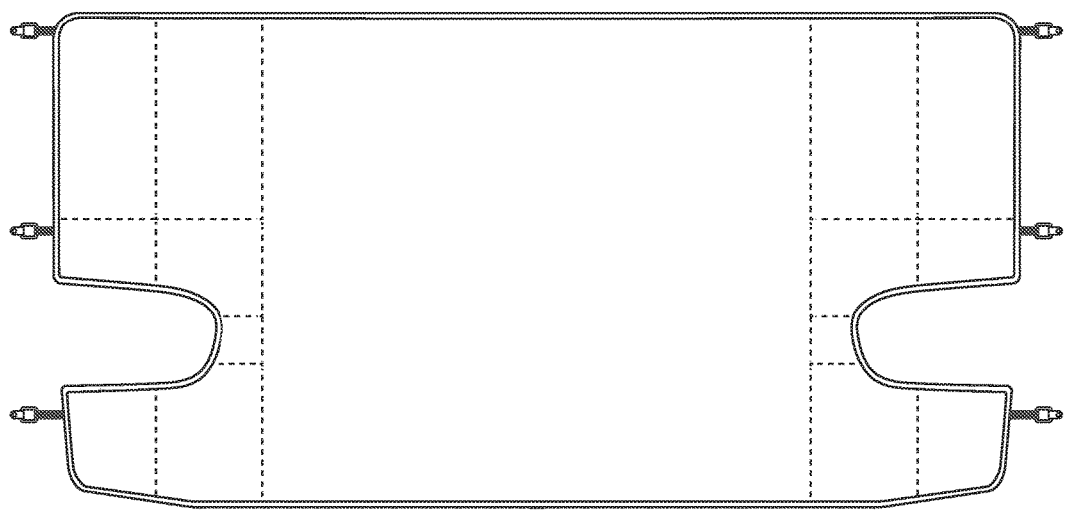
FIG. 16 illustrates a top view of a cargo cover in accordance with some embodiments.

FIG. 16 illustrates a top view of a cargo cover 1600 in accordance with some embodiments.

Figure 17:
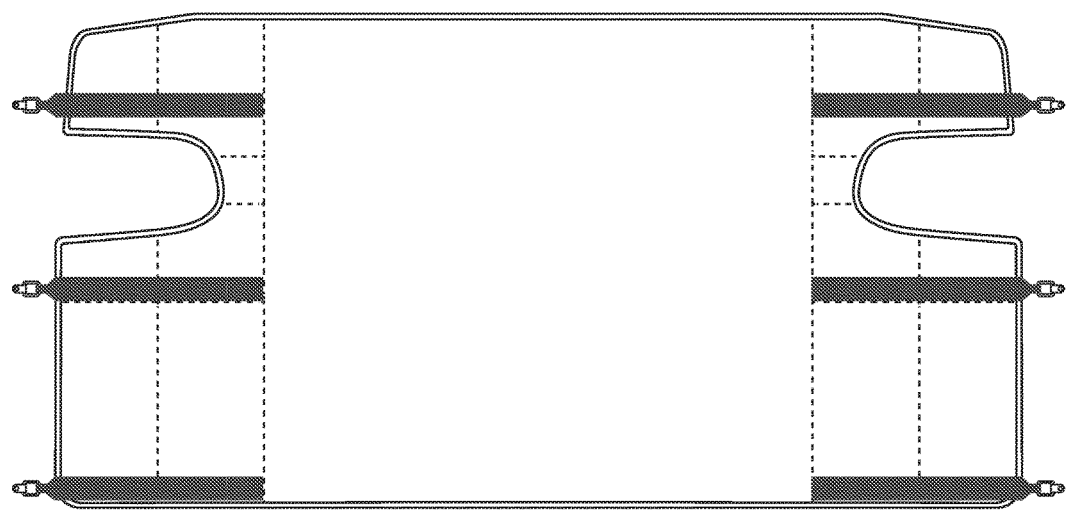
FIG. 17 illustrates a bottom view of a cargo cover in accordance with some embodiments.

FIG. 17 illustrates a bottom view of a cargo cover 1700 in accordance with some embodiments.

Figure 18:
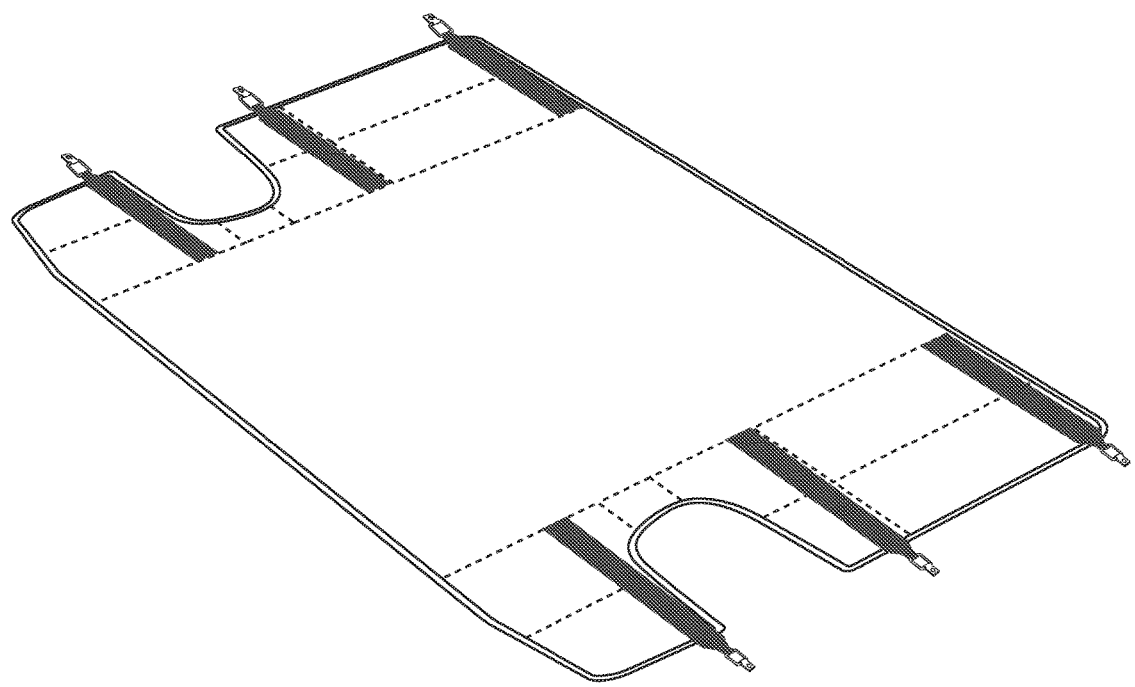
FIG. 18 illustrates a perspective view of a cargo cover in accordance with some embodiments.

FIG. 18 illustrates a perspective view of a cargo cover 1800 in accordance with some embodiments.

Figure 19:
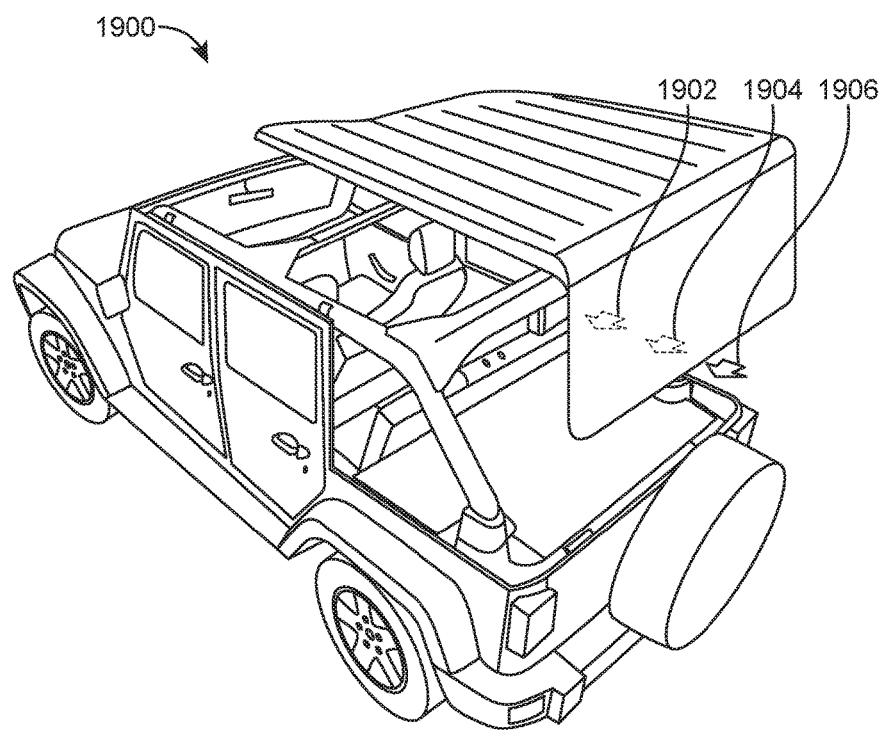
FIG. 19 illustrates how an example cargo cover may be installed in a vehicle in accordance with some embodiments.

FIG. 19 illustrates how an example cargo cover 1900 may be installed in a vehicle in accordance with some embodiments.

As shown in FIG. 19, the cover 1900 may be installed at at least three different locations 1902, 1904, and 1906 on a four-door vehicle's cargo area to serve as a backseat pocket, a cargo divider, and a tailgate cover, respectively. As shown in FIG. 19, the cover 1900 may be installed in three different configurations: full cover, half cover, and roll away.

Figure 20:
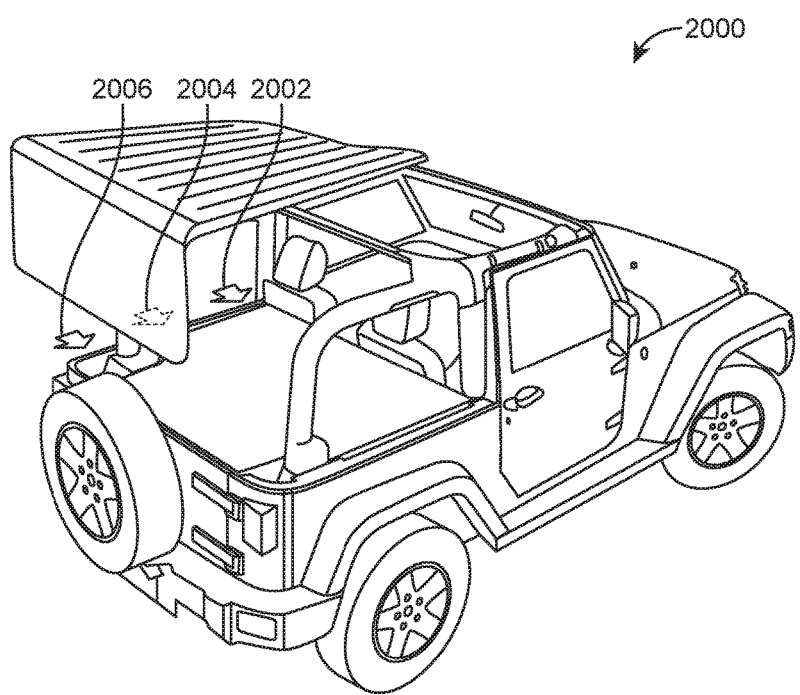
FIG. 20 illustrates how an example cargo cover may be installed in a vehicle in accordance with some embodiments.

FIG. 20 illustrates how an example cargo cover 2000 may be installed in a vehicle in accordance with some embodiments.

As shown in FIG. 20, the cover 2000 may be installed at at least three different locations 2002, 2004, and 2006 on a two-door vehicle's cargo area to serve as a backseat pocket, a cargo divider, and a tailgate cover, respectively. As shown in FIG. 20, the cover 2000 may be installed in three different configurations: when the backseats is up, when the backseat is folded, and when the back seat is removed.

Figure 21:
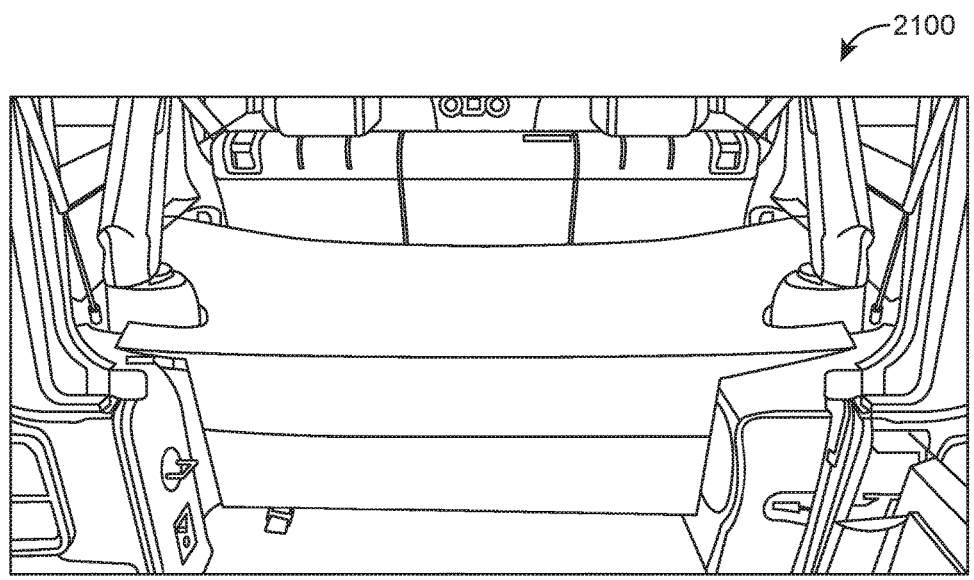
FIG. 21 illustrates how an example cargo cover may be installed in a vehicle in accordance with some embodiments.

FIG. 21 illustrates how an example cargo cover 2100 may be installed in a vehicle in accordance with some embodiments.

Figure 22:
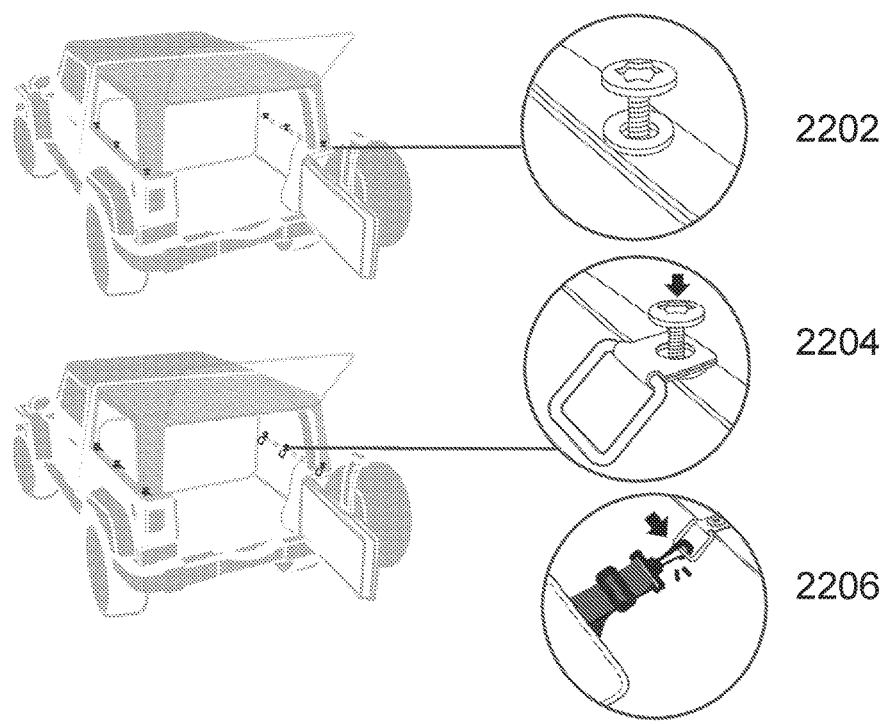
FIG. 22 illustrates how an example cargo cover may be affixed to a vehicle in accordance with some embodiments.

FIG. 22 illustrates how an example cargo cover 2200 may be affixed to a vehicle in accordance with some embodiments.

For example, screws and nuts 2202 may be installed on a vehicle's tube edge to hold down tie-down D-rings 2204. After the tie-down D-rings 2204 are installed, a cargo cover may be buckled or clipped to a tie-down D-ring 2204.

Figure 23:
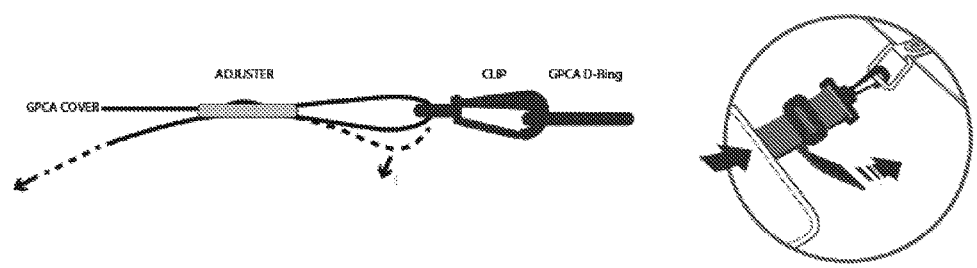

FIG. 23 illustrates how an example cargo cover 2300 may be affixed to a vehicle in accordance with some embodiments.

After a cargo cover is buckled or clipped to a tie-down D-ring 2204, the length of a strap may be adjusted to secure the cover 2300 to a vehicle's cargo area.

Figure 24:
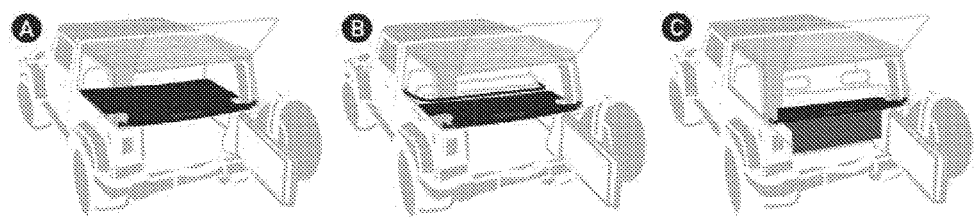
FIG. 24 illustrates how an example cargo cover may be folded and installed on a vehicle in accordance with some embodiments.

FIG. 24 illustrates how an example cargo cover may be folded and installed on a vehicle in accordance with some embodiments.

As shown in FIG. 24, the cover 2400 may be installed in three different configurations: when the backseats is up, when the backseat is folded, and when the back seat is removed.

Figure 25:
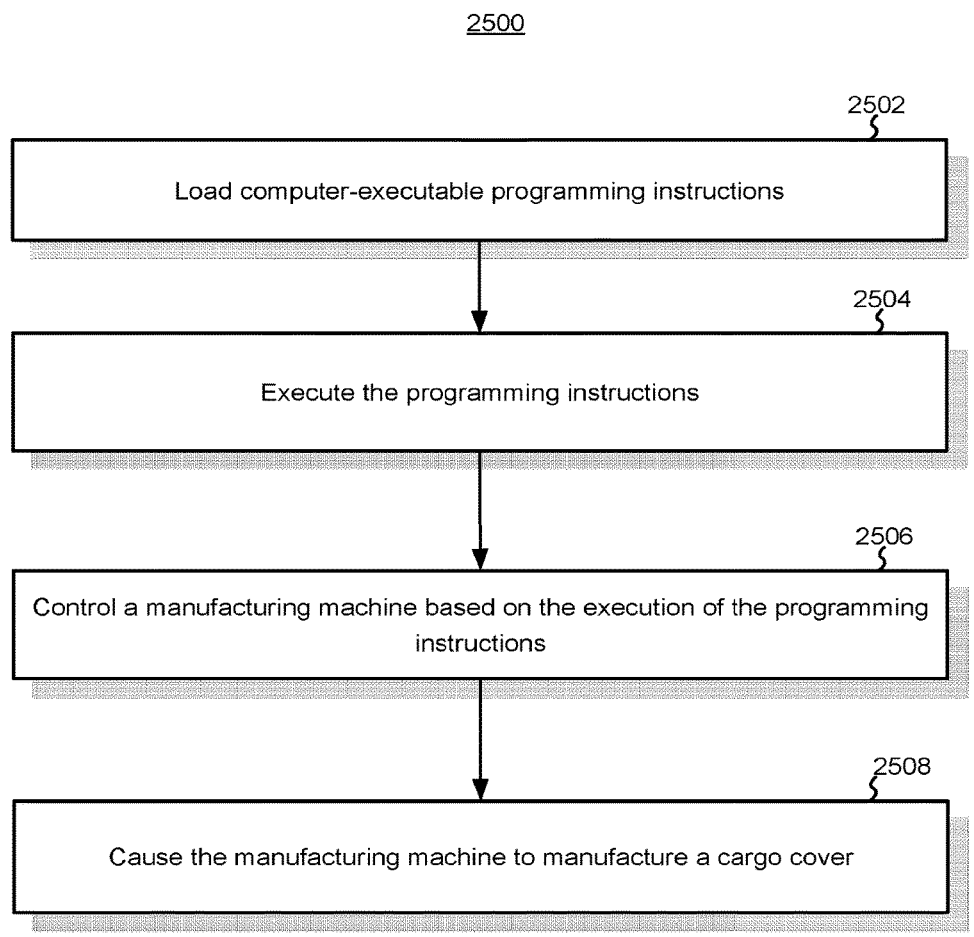
FIG. 25 is a flowchart illustrating an example process for manufacturing an example cargo cover in accordance with some embodiments.

FIG. 25 is a flowchart illustrating an example computer-implemented method 2500 for manufacturing a cargo cover. The computer system 2600, when properly programmed, can execute the method 2500.

In some implementations, the method 2500 includes using a computer to load (502) computer-executable programming instructions from a non-volatile memory of the computer to a volatile memory of the computer.

After loading the programming instructions, the computer may execute (2504) the programming instructions using the volatile memory.

Based on the execution of the programming instructions, the computer may control (2506) a manufacturing machine, for example, a cutting machine, a molding machine, or a pressing machine.

By controlling the manufacturing machine, the computer causes (2508) the manufacturing machine to manufacture a multifunctional card holder as described in one or more of the implementations disclosed in the present disclosure.

Figure 26:
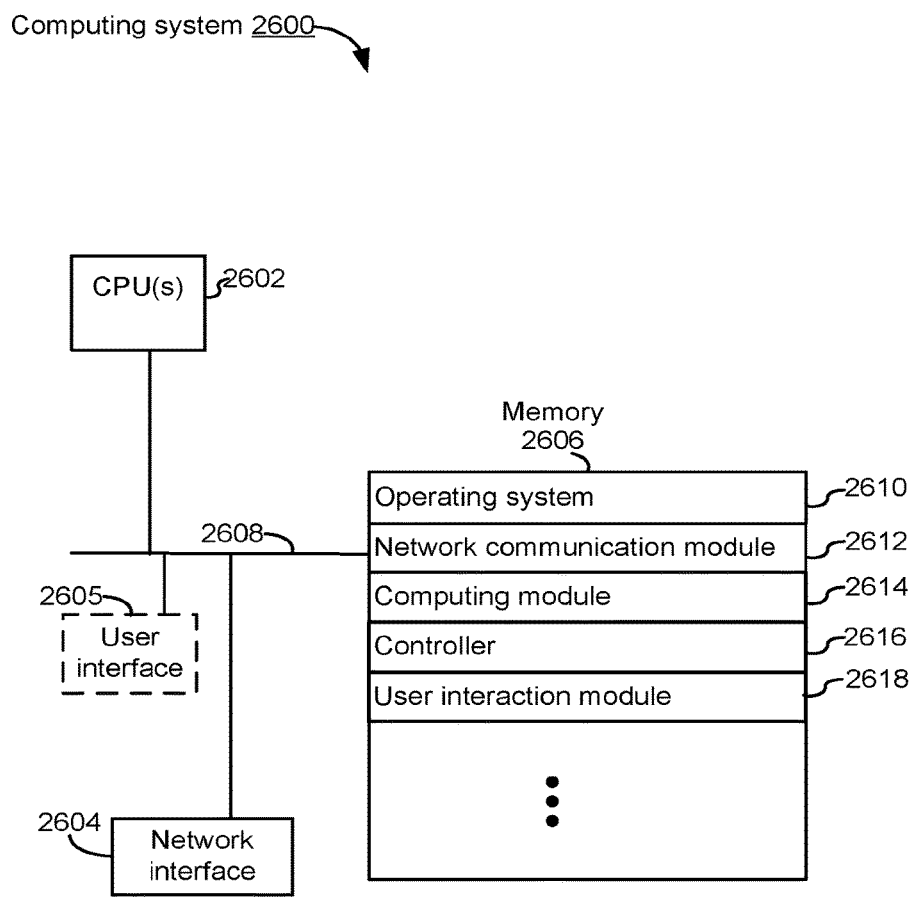
FIG. 26 is a block diagram illustrating an example computer system for manufacturing an example cargo cover in accordance with some embodiments.

FIG. 26 is a block diagram illustrating an example computer system 2600 for manufacturing a multifunctional card holder. The computer system 2600 in some implementations includes one or more processing units CPU(s) 2602 (also referred to as processors), one or more network interfaces, optionally a user interface, a memory 2606, and one or more communication buses 2610 for interconnecting these components. The communication buses 2610 optionally include circuitry (sometimes called a chipset) that interconnects and controls communications between system components. The memory 2606 typically includes high-speed random access memory, such as DRAM, SRAM, DDR RAM or other random access solid state memory devices, and optionally includes non-volatile memory, such as one or more magnetic disk storage devices, optical disk storage devices, flash memory devices, or other non-volatile solid state storage devices. The memory 2606 optionally includes one or more storage devices remotely located from the CPU(s) 2602. The memory 2606, or alternatively the non-volatile memory device(s) within the memory 2606, comprises a non-transitory computer readable storage medium. In some implementations, the memory 2606 or alternatively the non-transitory computer readable storage medium stores the following programs, modules and data structures, or a subset thereof:

- an operating system 2610 (e.g., an embedded Linux operating system), which includes procedures for handling various basic system services and for performing hardware dependent tasks;
- a network communication module 2612 for connecting the computer system with a manufacturing machine via one or more network interfaces (wired or wireless);
- a computing module 2614 for executing programming instructions;
- a controller 2016 for controlling a manufacturing machine in accordance with the execution of programming instructions; and
- a user interaction module 2618 for enabling a user to interact with the computer system 2600.

One or more of the above identified elements may be stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re arranged in various implementations. In some implementations, the memory 2606 optionally stores a subset of the modules and data structures identified above. Furthermore, the memory 2606 may store additional modules and data structures not described above.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first buckle could be termed a second buckle, and, similarly, a second buckle could be termed a first buckle, without changing the meaning of the description, so long as all occurrences of the "first buckle" is renamed consistently and all occurrences of the "second buckle" is renamed consistently. The first opening and the second opening are both buckles, but they are not the same buckle.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A sport utility vehicle cargo cover, comprising:
a foldable material comprising:
a first edge that is substantially straight;
a second edge located opposite the first edge;
a third edge located between the first edge and the second edge, wherein the third edge defines a first concave portion located closer to the second edge than the first edge;
a fourth edge located opposite the third edge, wherein the fourth edge defines a second concave portion located closer to the second edge than the first edge;
a first plurality of connectors coupled to the foldable material and extending from the third edge; and
a second plurality of connectors coupled to the foldable material and extending from the fourth edge.

2. The sport utility vehicle cargo cover of claim 1, wherein the first plurality of connectors comprises three connectors and the second plurality of connectors comprises three connectors.

3. The sport utility vehicle cargo cover of claim 2, wherein each connector of the first plurality of connectors and the second plurality of connectors comprises a strap.

4. The sport utility vehicle cargo cover of claim 3, wherein each strap comprises elastic and is length-adjustable.

5. The sport utility vehicle cargo cover of claim 2, wherein each connector of the first plurality of connectors and the second plurality of connectors comprises a metal clip.

6. The sport utility vehicle cargo cover of claim 2, wherein each connector of the first plurality of connectors and the second plurality of connectors comprises a tie-down D-ring.

7. The sport utility vehicle cargo cover of claim 2, wherein each connector of the first plurality of connectors and the second plurality of connectors comprises a metal slot configured to be bolted to an edge of a sport utility vehicle.

8. The sport utility vehicle cargo cover of claim 2, wherein a first connector of the first plurality of connectors is located between the second edge and the first concave portion and a first connector of the second plurality of connectors is located between the second edge and the second concave portion.

9. The sport utility vehicle cargo cover of claim 8, wherein a second connector and a third connector of the first plurality of connectors is located between the first edge and the first concave portion and a second connector and a third connector of the second plurality of connectors is located between the first edge and the second concave portion.

10. The sport utility vehicle cargo cover of claim 1, wherein the foldable material is configured to be folded at two or more different locations.

11. The sport utility vehicle cargo cover of claim 1, wherein the foldable material comprises polyester.

12. The sport utility vehicle cargo cover of claim 1, wherein each of the first concave portion and the second concave portion are arranged and configured to receive a support pillar of a sport utility vehicle.

13. The sport utility vehicle cargo cover of claim 1, further comprising a plurality of pockets coupled to the foldable material.

14. The sport utility vehicle cargo cover of claim 1, wherein the cargo cover is arranged and configured to be installed at three or more different locations within a cargo area of a sport utility vehicle.

15. The sport utility vehicle cargo cover of claim 1, wherein the foldable material defines a non-translucent color.

16. The sport utility vehicle cargo cover of claim 1, wherein the foldable material comprises a sunlight blocking material.

17. The sport utility vehicle cargo cover of claim 1, wherein the foldable material comprises a tear-resistant material.

18. The sport utility vehicle cargo cover of claim 1, wherein the foldable material comprises water-repelling material.

19. The sport utility vehicle cargo cover of claim 1, further comprising a plurality of tie-down straps coupled to the foldable material, wherein the plurality of tie-down straps are arranged and configured to couple one or more items to the cargo cover.

20. The sport utility vehicle cargo cover of claim 19, wherein each tie-down strap of the plurality of tie-down straps includes a slot for strapping an item to the cargo cover.

\* \* \* \* \*